US005856390A

United States Patent [19]
Gaylor et al.

[11] Patent Number: 5,856,390
[45] Date of Patent: Jan. 5, 1999

[54] HIGH TEMPERATURE COATING

[75] Inventors: Dennis Alan Gaylor, Clover, S.C.; Donald L. Burgoon, Gaston, N.C.

[73] Assignee: Performance Friction Corporation, S.C.

[21] Appl. No.: 706,821

[22] Filed: Sep. 3, 1996

Related U.S. Application Data

[63] Continuation of Ser. No. 188,936, Jan. 31, 1994.

[51] Int. Cl.$^6$ ....................................................... C08K 3/10
[52] U.S. Cl. ........................... 524/406; 524/495; 524/496; 523/153
[58] Field of Search .................................... 524/406, 495, 524/496; 523/153

[56] References Cited

U.S. PATENT DOCUMENTS

| | | |
|---|---|---|
| 1,639,611 | 8/1927 | Nash . |
| 2,217,001 | 10/1940 | Bockius et al. . |
| 2,826,512 | 3/1958 | Rex . |
| 2,948,955 | 8/1960 | Allen et al. . |
| 3,210,303 | 10/1965 | Biggs . |
| 3,321,287 | 5/1967 | Hunsherger . |
| 3,523,595 | 8/1970 | Massmann . |
| 3,684,061 | 8/1972 | Ogawa . |
| 3,684,062 | 8/1972 | Johnson . |
| 4,002,225 | 1/1977 | Marin . |
| 4,022,302 | 5/1977 | Janssen . |
| 4,115,284 | 9/1978 | Kinoshita et al. . |
| 4,310,452 | 1/1982 | Chester ..................................... 523/156 |
| 4,351,885 | 9/1982 | Depoisier . |
| 4,485,898 | 12/1984 | Bracken . |
| 4,539,233 | 9/1985 | Melotik . |
| 4,552,259 | 11/1985 | Albertson . |
| 4,605,105 | 8/1986 | Ogiwara . |
| 4,663,060 | 5/1987 | Holinski . |
| 4,758,277 | 7/1988 | Spruegal et al. ........................ 523/156 |
| 4,785,029 | 11/1988 | Honma et al. . |
| 4,808,275 | 2/1989 | Ohzora et al. . |
| 4,826,902 | 5/1989 | Hanabata et al. . |
| 5,108,629 | 4/1992 | Matsuda et al. . |
| 5,154,839 | 10/1992 | Hanano . |
| 5,268,398 | 12/1993 | Nakagawa et al. . |
| 5,348,425 | 9/1994 | Heiliger ................................... 405/297 |
| 5,363,821 | 11/1994 | Rao et al. . |

*Primary Examiner*—Melvyn I. Marquis
*Attorney, Agent, or Firm*—Cushman Darby & Cushman Intellectual Property Group of Pillsbury Madison & Sutro, LLP

[57] ABSTRACT

A coating for reducing brake pad noise is provided that includes about 40 to about 90% by weight of a phenolic thermal setting resin, about 1 to about 40% by weight of graphite, about 1 to about 40% by weight of molybdenum disulfide, and, 0 to about 40% by weight of fillers and pigments. The coating is applied to a brake pad and cured. A method for reducing brake noise is also provided which includes the steps of coating a brake pad surface with a coating including about 40 to about 90% by weight of a phenolic thermal setting resin, about 1 to about 40% by weight of graphite, about 1 to about 40% by weight of molybdenum disulfide, and 0 to about 40% by weight of fillers and pigments, and curing the coating. A method of coating a brake pad with a flame resistant brake pad coating is provided which includes the steps of electrostatic powder coating a surface of a brake pad with a coating which includes about 40 to 100% by weight of a phenolic thermal setting resin, about 0 to about 40% by weight of graphite, about 0 to about 40% by weight of molybdenum disulfide, and, 0 to about 40% by weight of fillers and pigments, and then curing the coating.

9 Claims, 3 Drawing Sheets

HIGH TEMPERATURE COATING

This is a continuation of application Ser. No. 08/188,936, filed Jan. 31, 1994.

BACKGROUND OF THE INVENTION

1. Field of the Invention

The invention relates to brake pad noise reduction and, more particularly, to a coating for reducing brake pad noise, a method of reducing brake pad noise, and a brake pad coated with the coating. The invention also relates to a flame resistant coating for a brake pad.

2. Description of Related Art

Conventional disc brake pads cause undesirable noise during braking, as shown in FIG. 1.

A conventional solution for reducing unwanted noise is to provide a separator plate as disclosed in U.S. Pat. No. 3,684,061 (Ogawa et al.). However, separator plates, such as the above, have many problems. They are very expensive to make because they must be sintered and machined which requires many process steps. Separator plates are relatively thick which must be compensated for by reducing the thickness of the brake pad or the backing of the brake pad. The sides of the brake pad are not protected by separator plates.

SUMMARY OF THE INVENTION

An object of the present invention is to provide a means for simple long lasting brake pad noise reduction which avoids the problems of conventional noise reducers.

Another object of the present invention is to provide a noise reduction coating which has superior resistance to flame, brake fluid, salt spray, alcohol, mineral oil, and contaminates from automobiles and the environment they drive in.

The foregoing and other objects of the invention are realized by providing a brake pad coating which in accordance with one aspect of the invention comprises about 40 to about 90% by weight of a phenolic thermosetting resin, about 1 to about 40% by weight of graphite, about 1 to about 40% by weight of molybdenum disulfide, and, 0 to about 40% by weight of fillers and pigments.

In accordance with another aspect of the invention, a surface of the brake pad is coated with a cured composition comprising about 40 to about 90% by weight of a phenolic thermosetting resin, about 1 to about 40% by weight of graphite, about 1 to about 40% by weight of molybdenum disulfide, and 0 to about 40% by weight of fillers and pigments.

A further aspect of the invention relates to a method for reducing brake noise comprising the steps of coating a brake pad surface with a coating comprising about 40 to about 90% by weight of a phenolic thermosetting resin, about 1 to about 40% by weight of graphite, about 1 to about 40% by weight of molybdenum disulfide, and 0 to about 40% by weight of fillers and pigments, and curing the coating.

Another aspect of the invention is realized by providing a method for applying a flame resistant brake pad coating which comprises the steps of electrostatic powder coating a surface of a brake pad with a coating comprising about 40 to 100% by weight of a phenolic thermosetting resin, about 0 to about 40% by weight of graphite, about 0 to about 40% by weight of molybdenum disulfide, and, 0 to about 40% by weight of fillers and pigments, and curing the coating.

Other objects, features, and characteristics of the present invention will become apparent upon consideration of the following description in the appended claims with reference to the accompanying drawings, all of which form a part of the specification.

DETAILED DESCRIPTION OF THE PREFERRED EMBODIMENTS

Figure 1:
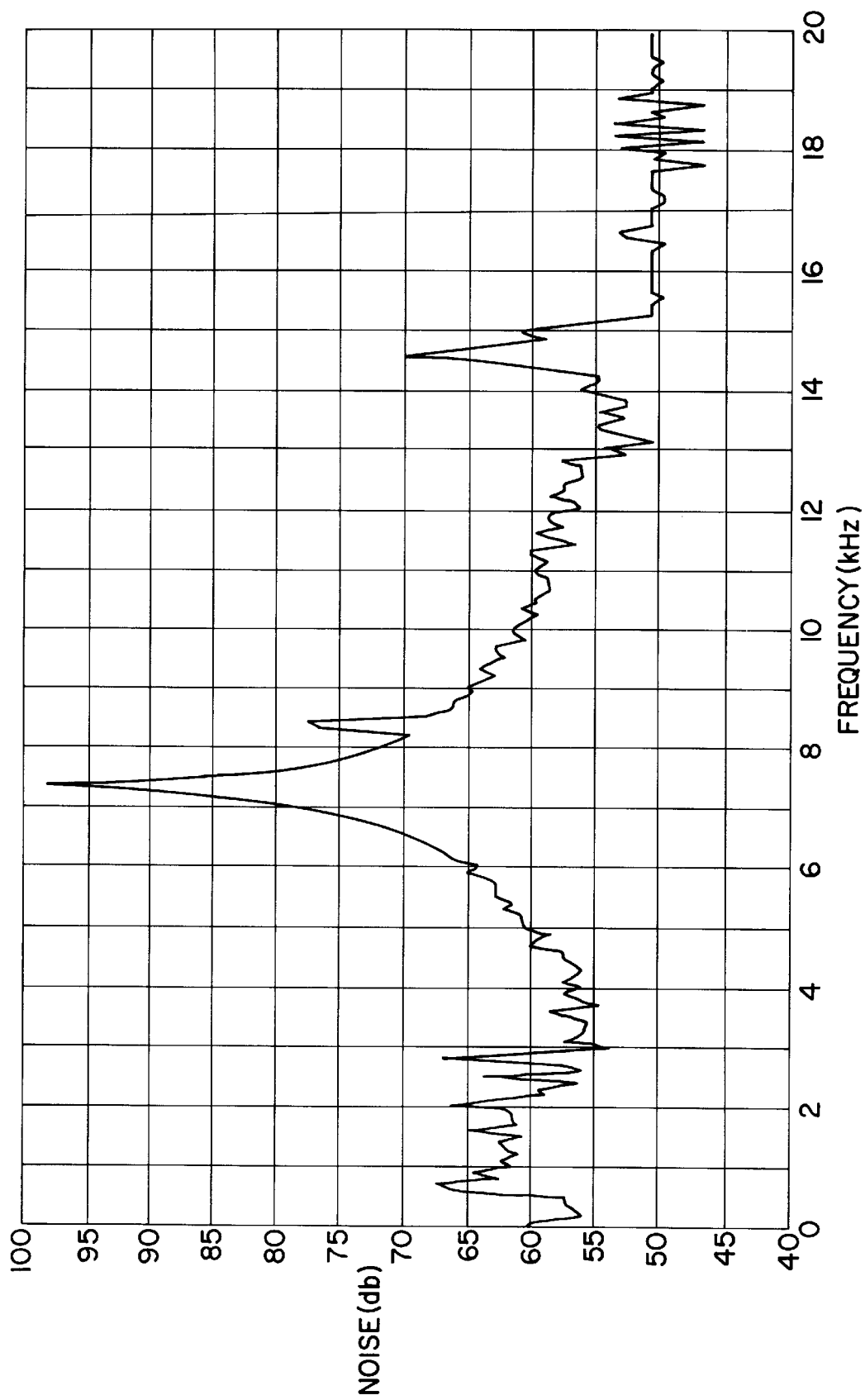
FIG. 1 is a graph showing the noise output of a conventional disc brake pad.

In accordance with the present invention, to reduce brake pad noise, a brake pad coating is provided which comprises about 40 to about 90% by weight of a phenolic thermosetting resin, about 1 to about 40% by weight of graphite, about 1 to about 40% by weight of molybdenum disulfide, 0 to about 40% by weight of fillers and pigments.

Preferably, the amount of phenolic thermal setting resin is about 50% by weight to about 70% by weight, and more preferably about 55% by weight to about 65% by weight.

Preferably, the amount of graphite is about 15% by weight to about 25% by weight.

Preferably, the amount of molybdenum disulfide is about 5% by weight to about 15% by weight.

Any phenolic thermosetting resin can be used in the present invention. For example, if the coating is to be applied to the brake pad in a liquid form, such as by spraying, a phenolic thermosetting resin which is liquid or solid at room temperature can be used. If the coating is to be applied to the brake pad in a powder form, such as by conventional powder coating techniques, a phenolic thermosetting resin which is solid at room temperature can be used.

Preferably, the phenolic thermosetting resin is carbonized during thermal setting. More preferably, the phenolic thermosetting resin is a phenol formaldehyde thermosetting resin which carbonizes during curing.

Fillers are not required in the coating, but they can be added to improve the aesthetics of the coating. Examples of fillers that can be added include flow agents, flow inhibitors, and the like. The fillers can include one or more known rubbers. Fillers for improving flame resistance are not required because the coating has a flame resistance in excess of 1000° F.

Pigments can be added to the coating. Examples of suitable pigments are carbon black, iron oxides, and the like.

The main ingredients in the coating are preferably ingredients that not detrimental to the stopping performance of the brake.

The coating can be formed into a powder for powder coating the brake pad by combining the ingredients and mixing, for example, by agitation, extrusion, and the like. A phenolic thermosetting resin, molybdenum disulfide and graphite are present in an exemplary brake pad to be coated.

Another aspect of the invention relates to a process for reducing brake noise which includes the steps of coating a brake pad surface with a coating comprising about 40 to about 90% by weight of a phenolic thermosetting resin, about 1 to about 40% by weight of graphite, about 1 to about 40% by weight of molybdenum disulfide, and 0 to about 40% by weight of fillers and pigments, and curing said coating composition.

The coating is preferably applied to all of the exposed brake pad backing surfaces, and not on the friction pad surface.

The coating can be applied to the brake pad by any conventional means, for example, spraying and powder coating. Preferably, the coating is applied to the brake pad using conventional powder coating techniques.

In conventional powder coating techniques, for example, the surface of the brake pad can be electrostatically charged positive and the powder coating can be electrostatically charged negative which will cause the powder coating to be attracted to the charged surface of the brake pad.

If the coating is to be applied to the brake pad by spraying, the coating composition can be dispersed or dissolved in a suitable solvent.

After applying the coating to the brake pad, the coating can be thermoset or cured, for example, by heating to a temperature and for a time sufficient to crosslink the phenolic thermosetting resin, which can be, for example, about 295° F. to about 375° F. for about 3 seconds to about 20 minutes.

Preferably, the phenolic thermosetting resin and curing conditions are chosen such that the thermosetting resin is carbonized during curing. Examples of phenolic thermosetting resins which will carbonize during curing are phenol formaldehyde thermosetting resins.

The coating can be applied in a continuous or batch method.

Another aspect of the invention relates to a method of coating a brake pad with a flame resistant coating comprising the steps of electrostatic powder coating a surface of the brake pad with a coating comprising about 40 to 100% by weight of a phenolic thermosetting resin, about 0 to about 40% by weight of graphite, about 0 to about 40% by weight of molybdenum disulfide, and, 0 to about 40% by weight of fillers and pigments, and the curing the coating as described above. If more than about 90% of phenolic thermosetting resin is used, such as 100%, the coating will provide flame resistance and corrosion resistance, but will not reduce brake noise as effectively as the brake pad coatings described above.

A further aspect of the invention includes a brake pad having thereon a coating as described above.

The invention will be further explained by the following non-limiting example.

EXAMPLE 1

A paint formulation was made by mixing together the following ingredients by extrusion:

| | |
|---|---|
| Phenolic thermosetting Resin (12299, Schenectidy, Inc.) | about 62% |
| Graphite (#1 flake, Asbury Graphite Co.) | about 19% |
| Molybdenum Disulfide (Climax Molybdenum) | about 9.5% |
| Pigment | about 5% |
| Filler (flow agent) | about 5% |

The coating was applied to a disc brake pad of a Ford E-150 Truck, by a continuous conventional electrostatic method.

Figure 3:
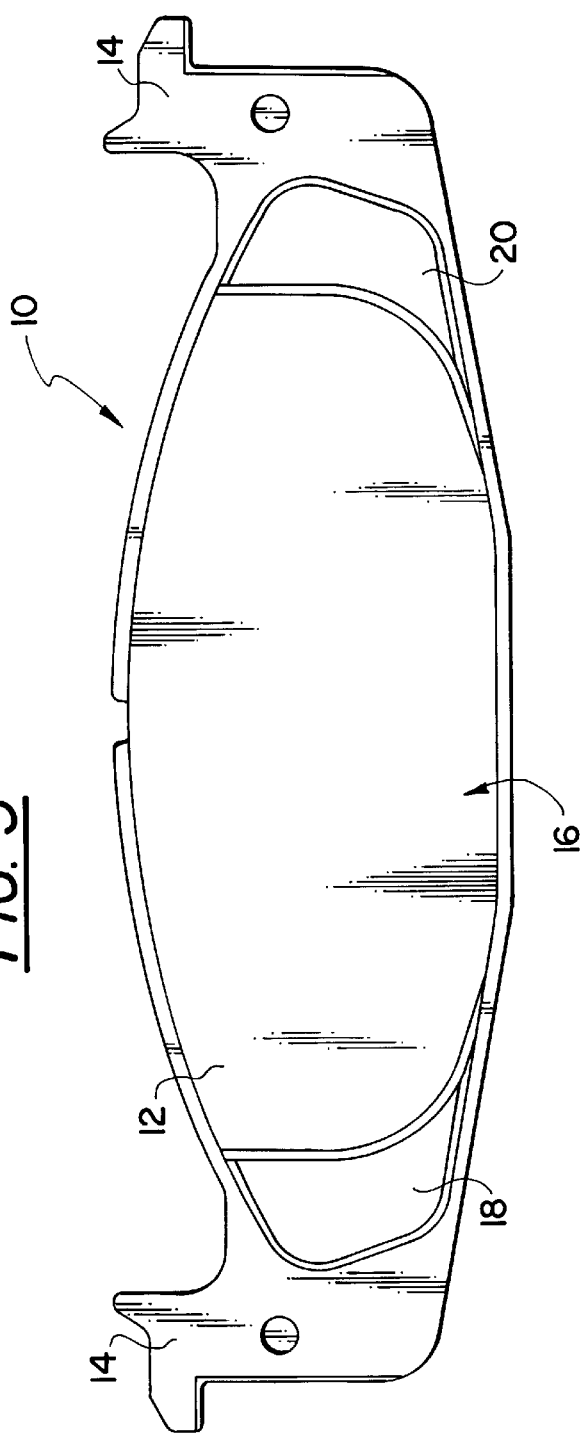
FIG. 3 illustrates a perspective of a disc brake pad for a Ford E-150 truck.
Figure 5:
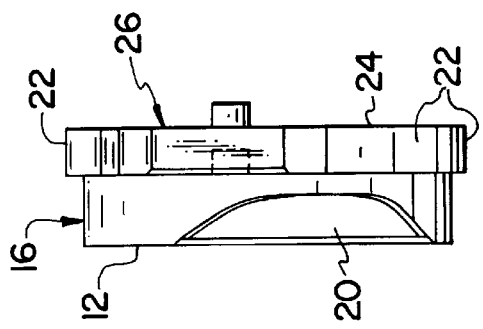
FIG. 5 illustrates a perspective of a disc brake pad for a Ford E-150 truck.
Figure 4:
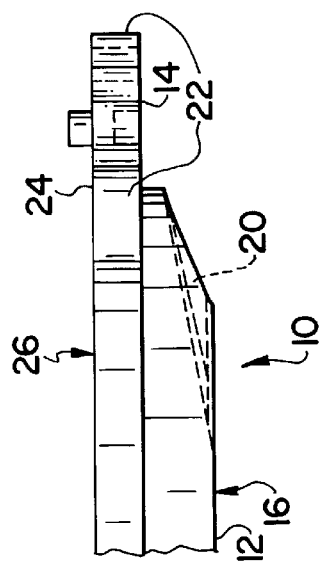
FIG. 4 illustrates a perspective of a disc brake pad for a Ford E-150 truck.

The brake pad is shown generally at 10 in FIGS. 3–5. The brake pad 10 includes a friction material 16 and a metal backing plate 26. The friction material 16 includes tapered surfaces 18 and 20. The coating material was applied on the back surface 24 and the side surfaces 22 of the backing plate 26. Overspray of the coating material occurred on the front surface 14 of the backing plate 26 and on the tapered surfaces 18 and 20 of the friction material 16. No coating material was present on the front surface 12 of the friction material 16.

The coating was then cured by baking in an oven at about 335° F. for about 3 minutes.

The coated brake pad was tested as follows.

Fire Test:

A laboratory oven was preheated to 1000° F. A coated disc brake pad as made in Example 1 was inserted into the oven. The coated disc brake pad was checked each minute for ten minutes. No flaming of the coating occurred. Coating exhibited minor discoloration. Thus a coating composition in accordance with the invention applied to brake pads and suitable cured exhibit substantially no flaming when placed in an oven preheated to 1000° F. for ten (10) minutes.

Salt Spray Test:

The resistance to salt spray of a coated brake pad made according to Example 1 was tested by an independent laboratory, Greening (Detroit, Mich.) using ASTM-B-117 and evaluated by ASTMD1654-79A. The coating had resistance to salt spray in the range of 8 to 10, which is the highest rating possible.

Brake Fluid Test:

The resistance to brake fluid of the coated brake pad made according to Example 1 was tested using the Allied Signal method UI-145 coating specification. Brake fluid was left in contact with the coating on the brake pad at room temperature for about 24 hours. 50 hand rubs with a cotton ball were then done on the coating. No coating loss was exhibited.

Alcohol Test:

The resistance to alcohol of the coated brake pad made according to Example 1 was tested by contacting the coating of the brake pad with 99% isopropyl alcohol at room temperature for about 24 hours. 50 hand rubs with a cotton ball were then done on the coating. No coating loss was exhibited.

Mineral Oil Test:

The resistance to mineral oil of the coated brake pad made according to Example 1 was tested by contacting the coating of the brake pad with mineral oil at room temperature for about 24 hours. 50 hand rubs with a cotton ball were then done on the coating. No coating loss was exhibited. Thus, a coating composition in accordance with the invention is resistant to mineral oil.

LACT Test:

A LACT Test (Los Angeles City Traffic Test) was done on a coated brake pad made according to Example 1 by an independent laboratory, Bill Stroppe & Sons, Inc. (Los Angeles, Calif.). Ford E-150 trucks having coated disc brake pads as made in Example 1, were each driven on Los Angeles City traffic for about 2000 miles. The coating on each of the disc brake pads survived and remained intact. Thus a coating composition in accordance with the invention applied to brake pad and suitably cured has sufficient integrity to complete a Los Angeles City Test and remain substantially intact. As is also apparent from the foregoing tests, the coating composition of the invention adheres to brake pads.

Figure 2:
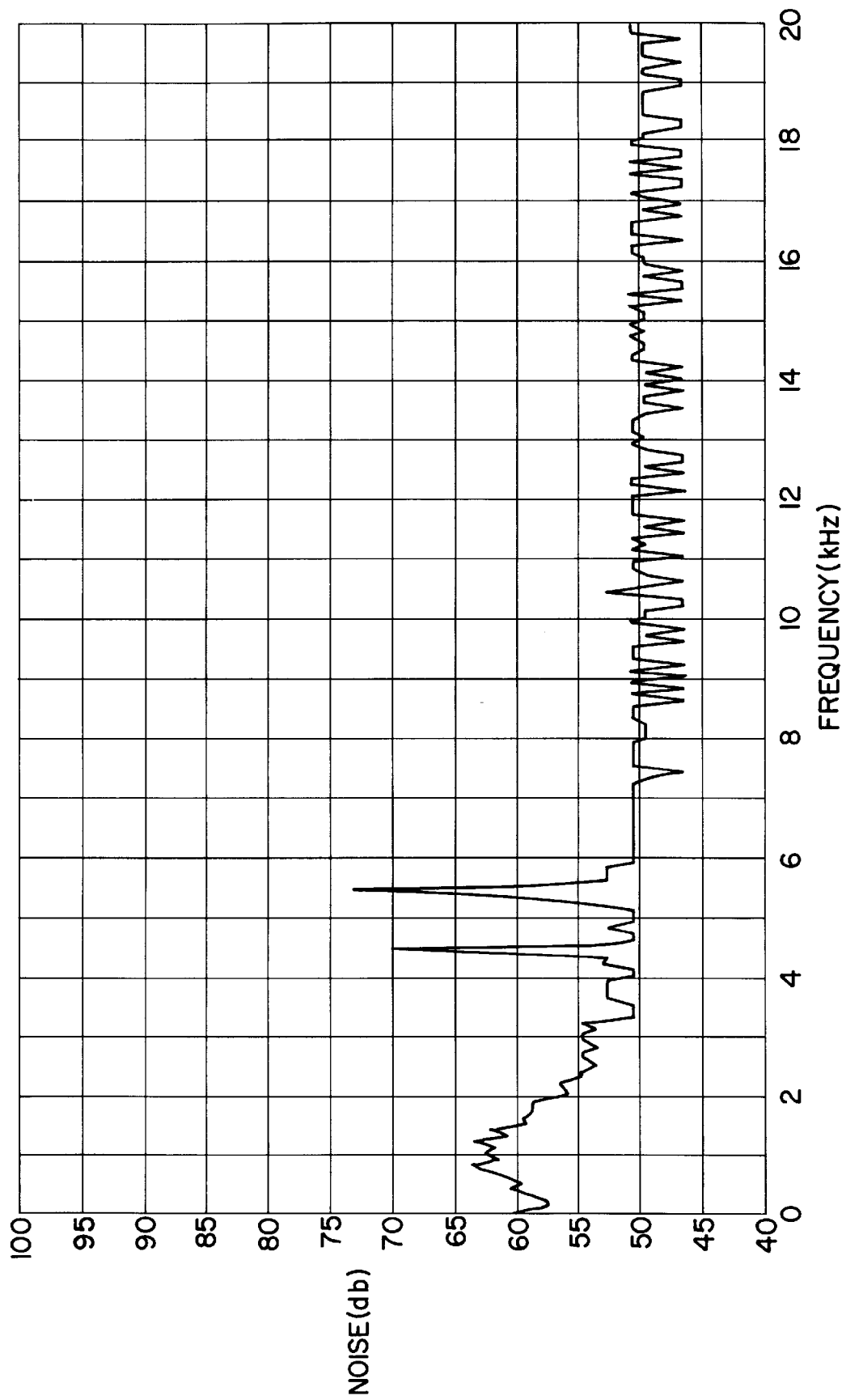
FIG. 2 is a graph of the noise output of a conventional disc brake pad coated according to the present invention.

Noise Test:

The noise output of a conventional front disc brake and a front disc brake having the disc brake pads coated as in Example 1 mounted on a Ford E-150 was measured by an independent laboratory, Bill Stroppe & Sons, Inc. (Los Angeles, Calif.). The brake line pressure was 400 PSI and the temperature between the rotor and brake pad was 375° F. A microphone attached to an oscilloscope was used to measure the noise. The noise output was graphed as shown in FIGS. 1 and 2. FIG. 1 illustrates the noise output of the conventional front disc brake and FIG. 2 illustrates noise output of the front disc brake having the disc brake pads coated as in Example 1. As can be seen by a comparison of FIG. 1 and FIG. 2, the coated pad in accordance with the invention substantially reduces brake pad noise as compared to the conventional front disc brake.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A coating composition adapted for application to brake pads, which when suitably cured exhibits the combination of properties of:
   (i) substantially reducing brake pad noise;
   (ii) substantially no flaming when disposed in an oven preheated to 1000° F. for 10 minutes;
   (iii) resistance to mineral oil;
   (iv) adhesion to brake pads; and
   (v) sufficient integrity to complete a Los Angeles City Traffic Test comprising driving a vehicle having brake pads coated with said coating composition in Los Angeles City traffic for about 2,000 miles, said coating remaining substantially intact,
   said coating composition consisting essentially of:
   about 40 to about 90% by weight of a phenolic thermosetting resin;
   about 1 to about 40% by weight of graphite;
   about 1 to about 40% by weight of molybdenum disulfide; and
   0 to about 40% by weight of fillers and pigments.

2. A coating for reducing brake pad noise according to claim 1, comprising about 50 to about 70% by weight of said phenolic thermosetting resin, about 15 to about 25% by weight of graphite, and about 5 to about 15% by weight of molybdenum disulfide.

3. A coating for reducing brake pad noise according to claim 2, comprising about 55 to about 65% by weight of said phenolic thermosetting resin.

4. A coating for reducing brake pad noise according to claim 1, wherein said phenolic thermosetting resin is carbonizable during curing.

5. A coating for reducing brake pad noise and adapted for application to brake pads, which when suitably cured exhibits the combination of properties of:
   (i) substantially reducing brake pad noise;
   (ii) substantially no flaming when disposed in an oven preheated to 1000° F. for 10 minutes;
   (iii) resistance to mineral oil;
   (iv) adhesion to brake pads; and
   (v) sufficient integrity to complete a Los Angeles City Traffic Test comprising driving a vehicle having brake pads coated with said coating composition in Los Angeles City traffic for about 2,000 miles, said coating remaining substantially intact, said composition comprising:
   about 40 to about 90% by weight of a phenol formaldehyde thermosetting resin;
   about 1 to about 40% by weight of graphite;
   about 1 to about 40% by weight of molybdenum disulfide; and
   0 to about 40% by weight of fillers and pigments.

6. A coating for reducing brake pad noise according to claim 1, wherein said brake pad to be coated comprises a phenolic thermosetting resin, molybdenum disulfide, and graphite.

7. A powder coating adapted for electrostatic coating methods, which when suitably cured exhibits substantially no flaming when placed in an oven preheated to 1000° F. for 10 minutes, said coating composition consisting essentially of:
   about 40 to about 90% by weight of a phenolic thermosetting resin;
   about 1 to about 40% by weight of graphite;
   about 1 to about 40% by weight of molybdenum disulfide; and
   0 to about 40% by weight of fillers and pigments.

8. A liquid coating adapted for spray coating methods, which when suitably cured exhibits substantially no flaming when placed in an oven preheated to 1000° F. for ten minutes, said coating composition consisting essentially of:
   about 40 to about 90% by weight of a phenolic thermosetting resin;
   about 1 to about 40% by weight of graphite;
   about 1 to about 40% by weight of molybdenum disulfide;
   0 to about 40% by weight of fillers and pigments; and
   a solvent.

9. A coating composition according to claim 1, wherein said coating composition is adapted to provide the further property, when suitably cured, of having resistance to salt spray of in the range of 8 to 10 measured using ASTM-B117 and ASTM-D1645-79A.

* * * * *